Jan. 31, 1956 — J. LATZEN — 2,733,085
BALL AND SOCKET JOINT
Filed Aug. 15, 1950

Inventor
JOSEF LATZEN

BY Robert H. Jacob
AGENT

United States Patent Office 2,733,085
Patented Jan. 31, 1956

2,733,085

BALL AND SOCKET JOINT

Josef Latzen, Dusseldorf-Oberkassel, Germany, assignor to A. Ehrenreich & Cie., Dusseldorf-Oberkassel, Germany, a firm Application August 15, 1950, Serial No. 179,537

1 Claim. (Cl. 287—87)

My invention relates to a ball and socket joint for all purposes, in particular for steering gears, the ball head of the joint rod being supported in the joint housing within dish-shaped surfaces.

Object of the present invention is to provide an exactly fitted ball and socket joint enabling a simplified process of manufacture and a considerable reduction of the production costs.

According to prior art ball and socket joints the ball head is supported within dish-shaped surfaces extending up to the middle zone of the ball. These well-known ball and socket joints have the disadvantage that the observance of equal limits over the whole supporting surface is very difficult and costly.

It has been found that the tolerance zone between the ball head and the bearing shell reduces towards the exit of the housing to about the half in comparison with the middle zone of the ball. The present invention uses this perception by providing both a narrow dish-shaped supporting surface within the housing at the exit of the housing and a cylindrical annular supporting surface adapted to support the middle zone of the ball. Such a design ensuring a most exact fit enables to facilitate the production as it is easier to obtain a smaller extent of tolerance by producing cylindrical surfaces than spherical ones. Moreover the guiding and lubricating conditions are considerably improved. A ball head produced by rolling or squeezing may be used if the grooves resulting from this method of manufacture are arranged in a suitable manner.

Other advantages obtained will be disclosed hereinafter.

The structural features of the ball and socket joint according to this invention are set forth in the following specification and will be better understood by practitioners from the accompanying drawing, in which Fig. 1 is a vertical view of the lower part of a ball and socket joint, partly in section;

Similar letters refer to similar parts throughout the several views.

Figure 1:
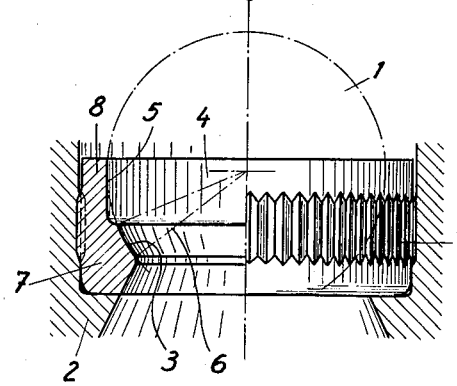

Referring now to the drawings a ball head 1 of a joint rod is supported within a housing 2 by both a narrow dish-shaped bearing surface 3 at the exit of the housing and a cylindrical annular surface 5 enclosing a middle zone 4 of the ball head 1 arranged vertically to the rod axis. The narrow dish-shaped bearing surface 3 only encloses a spherical sector 6.

Preferable and supplemental structural features of the ball and socket joint according to this invention are ball bearing means of specific shape fitted and fixed intermediate the inner walls of the housing 2 and the ball head 1 as well as different shaped grooves cut into the inner wall of the housing or the ball head 1.

Figure 2:
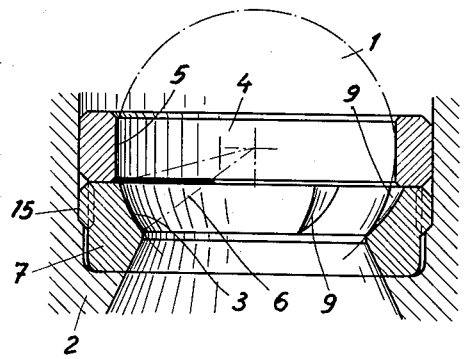
Fig. 2 shows a similar structure, but the narrow shell ring and the cylindrical ring are separate parts.
Figure 3:
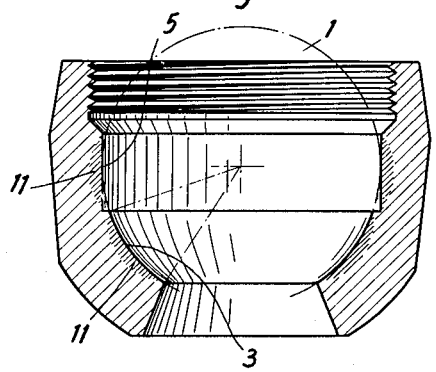
Fig. 3 is a sectional view of one half of a joint housing, the inner wall of which forms both a narrow dish-shaped supporting surface and a cylindrical annular surface.
Figure 4:
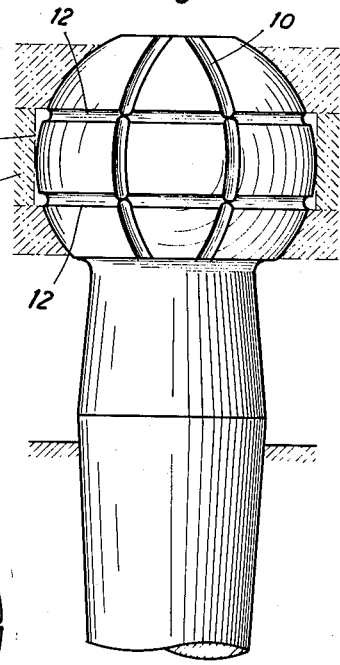
Fig. 4 shows a modified design of a grooved ball head produced by rolling, squeezing or grinding, partly in section.

As seen in Figs. 1 and 2 the narrow dish-shaped bearing surface is formed by a narrow shell ring 7 having a circumferential knurled rim 15, thus compensating any eccentricity and ensuring a good seat. According to Fig. 1 a cylindrical annular ring 8 forming the cylindrical annular surface 5 is made in one piece with the narrow shell ring 7, whereas in the design shown in Fig. 2 a special cylindrical ring 8 for supporting the middle zone of the ball 1 is provided. The cylindrical ring 8 may be slitted or be formed by several parts. Lubricating grooves 9 may be stamped or cut into the narrow shell ring 7 (Fig. 2) which circumferential lubricating grooves 10 in the ball head may correspond to (Fig. 4). If, according to the design shown in Fig. 3, the supporting surfaces 3 and 5 are formed by the inner wall of the housing 2 said surfaces may be selectively case-hardened by burning or electrical methods the depth of a hardened sickle-shaped zone 11 being controllable.

Figure 5:
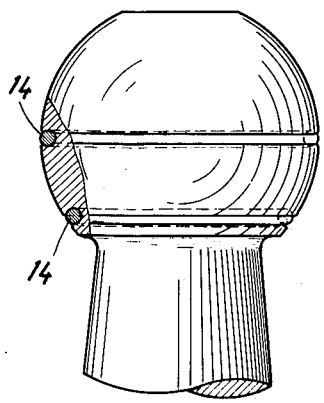
Figs. 5 and 6 show two further types of ball heads adapted for use in a socket joint in accordance with the invention.
Figure 6:
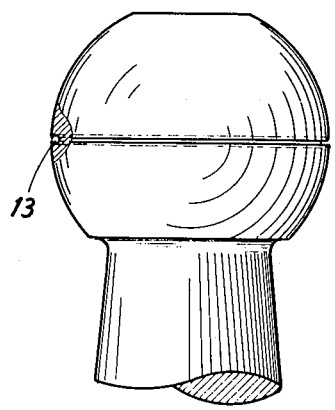

If the ball head is produced by squeezing or rolling in direction of the longitudinal axis of the ball headed rod the unavoidable recesses are so arranged that any groove engages with the cylindrical annular surface 5. According to Fig. 4 grooves 12 arranged vertically to the longitudinal axis of the ball headed rod are provided. Fig. 6 shows a small recess 13 being substantially closed by the squeezing or rolling process. Hardened rings 14 as shown in Fig. 5 may be put into the circumferential grooves 12 for being embedded by the squeezing process, thus improving the resistance to wear. The ball head grooves may be used for lubricating purposes.

Various structural changes and modifications may be made in ball and socket joints for all purposes, in particular for steering gears as shown and described, without departing from the spirit and the salient ideas of this invention.

What I claim is:

Ball and socket joint for steering gears or the like, comprising a ball headed rod, a housing permitting free angular motion of the rod and bearing means presenting two separate bearing areas, one defining a cup shaped bearing surface around a small section of said ball head adjacent the neck of the rod and the other a cylindrical bearing surface for engagement with the central section of said ball disposed perpendicularly to the axis of the rod, said ball head being provided with circumferential grooves and hardened rings disposed in said grooves.

References Cited in the file of this patent

UNITED STATES PATENTS

| 1,796,142 | Crawford | Mar. 10, 1931 |
| 1,816,661 | Skillman | July 28, 1931 |
| 1,835,160 | Hufferd | Dec. 8, 1931 |
| 1,856,246 | Frederick | May 3, 1932 |
| 2,026,338 | Zerk | Dec. 31, 1935 |
| 2,061,811 | Sinko | Nov. 24, 1936 |
| 2,182,601 | Venditty | Dec. 5, 1939 |

FOREIGN PATENTS

| 93,138 | Austria | June 11, 1933 |
| 509,969 | Great Britain | July 25, 1939 |